Figures 1, 2:
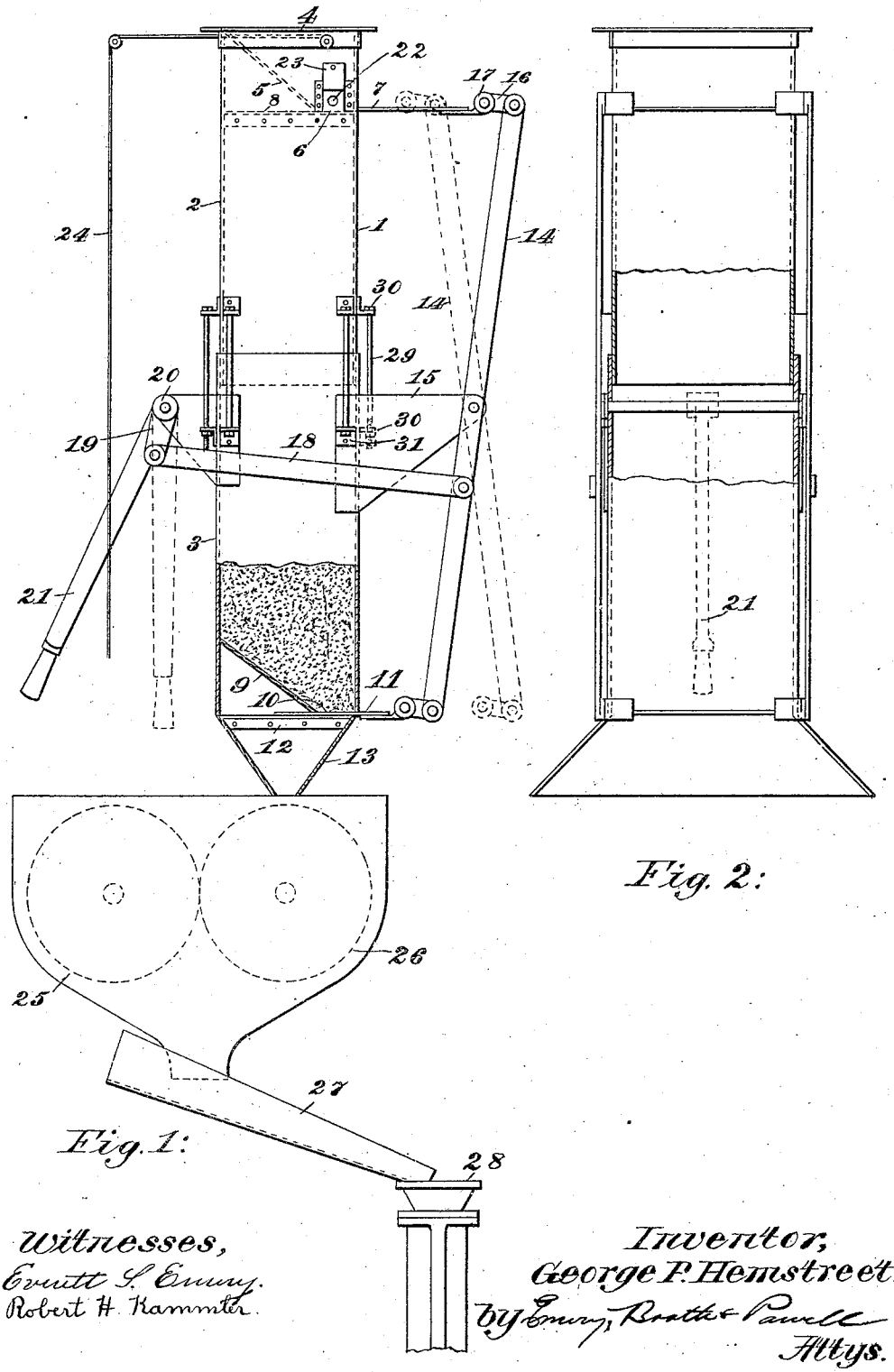

No. 852,718. PATENTED MAY 7, 1907.
G. P. HEMSTREET.
MEASURING APPARATUS.
APPLICATION FILED SEPT. 19, 1904.

Witnesses,
Everitt S. Emery.
Robert H. Kammter.

Inventor,
George P. Hemstreet.
by Emery, Booth & Powell
Attys.

UNITED STATES PATENT OFFICE.

GEORGE P. HEMSTREET, OF HASTINGS-UPON-HUDSON, NEW YORK, ASSIGNOR TO THE INTERNATIONAL PAVEMENT COMPANY, OF HARTFORD, CONNECTICUT, A CORPORATION OF CONNECTICUT.

MEASURING APPARATUS.

No. 852,718.	Specification of Letters Patent.	Patented May 7, 1907.

Application filed September 19, 1904. Serial No. 224,985.

*To all whom it may concern:*

Be it known that I, GEORGE P. HEMSTREET, a citizen of the United States, residing at Hastings-upon-Hudson, county of Westchester, and State of New York, have invented an Improvement in Measuring Apparatus, of which the following description, in connection with the accompanying drawings, is a specification, like letters on the drawings representing like parts.

This invention relates to means for conveniently measuring and portioning out material.

In the embodiment hereinafter to be described the invention is applied to the measuring of materials for the manufacture of composition paving blocks.

In the manufacture of such blocks it is essential that the ingredients thereof shall bear certain definite proportions to each other, and to this end the present invention contemplates the use of a measuring vessel, preferably of variable capacity, to which the material, such as finely crushed stone, may be fed in a convenient manner, and means whereby the supply of material to the vessel may be readily cut off, while at the same time the contents of the vessel are retained therein, and also means whereby the vessel may be discharged of the previously determined quantity of material.

The invention further contemplates means in conjunction with the aforesaid apparatus for indicating that the vessel has reached its full capacity.

The above and other features of the invention will be clearly understood from a description of one particular embodiment thereof, which illustrates the best form now known to me, and which is shown in the accompanying drawings, in which,—

Figure 1 is a longitudinal, vertical section of the device partly broken away to more clearly show the interior structure, the apparatus being here shown in conjunction with a mixing device designed to be supplied therefrom; Fig. 2 shows a front elevation of the measuring device with parts removed to indicate the interior structure.

In the embodiment of the invention which has here been selected for illustrative purposes, the apparatus consists of a measuring vessel 1, comprising the telescoping members 2 and 3, the upper member being slidable within the lower one to avoid obstruction to the discharge of the vessel. The upper end of the vessel is provided with an opening 4 to receive material from any convenient source and below the opening 4 is a deflector plate 5, which serves to direct the material to the inlet opening 6 of the measuring vessel. The inlet opening 6 is controlled by a gate 7, here shown as a plate, which rests and slides upon the guide-ways or supporting brackets 8 on either side of the vessel. The lower or discharge end of the vessel 1 is also provided with a deflecting plate 9, which directs the material to be discharged to the discharge opening 10, which, as in the case of the inlet opening, is controlled by a gate 11 supported and slidable along similar ways 12.

In order to conveniently direct the contents of the vessel to a desired point, the lower end thereof may be provided with a suitable spout 13. The gates 7 and 11 controlling the inlet and outlet openings, respectively, of the vessel are herein shown as actuated through the instrumentality of levers 14, which are centrally pivoted upon brackets 15 attached to either side of the lower section of the vessel 1. The upper and lower extremities of the levers 14 are connected with the inlet and outlet gates 7 and 11, respectively, by means of pivoted links 16 extending between the extremities of the levers and the hinge members 17 attached to said gates. For convenience of operation the levers 14 are connected by means of the links 18 with rock arms 19 mounted upon the rock shaft 20, to which also is secured at any convenient point, as at the center, a hand lever 21 extending within convenient reach of the operator. At the upper end of the vessel 1 and adjacent the inlet opening 6 thereof is provided a sight hole 22, which is normally closed by a weighted sliding door 23, the latter in turn being provided with a suitable actuating cord 24 passing over suitable pulleys and extending within convenient reach of the operator.

The measuring apparatus may be stationed at any convenient point with relation to the mixing machine, the latter being here represented merely for the purposes of illustration as a vessel 25 provided with suitable mixing apparatus 26 and discharging into a convenient chute 27, whereby the mixed material is led to a conduit 28, and thence into a suitable press where the composition blocks are finally formed.

The operation of the measuring apparatus is as follows: With the inlet and outlet gates in the position indicated in full lines in Fig. 1, the material to be measured is turned into the vessel and is deflected by the plate 5 to the inlet opening 6. The operator from time to time lifts the gate 23, thus uncovering the sight hole 22 in order to determine the level of the material within the vessel. When the vessel is filled to a point above the opening 6 and above the sight hole 22, a small portion of the material will be discharged through the sight hole, thus indicating that the measuring vessel is filled to its full capacity; thereupon the operator by actuating the lever 21 may close the inlet 6 by means of the gate 7 and shut off the further supply of material. The gates 7 and 11 are made of such length that it is possible to close the upper or inlet opening before the gate 11 uncovers the outlet opening 10, whereby the measured quantity of material may be retained within the vessel ready for discharge at any convenient time. Upon continued actuation of the lever 21 the gate 11 will be further withdrawn until it uncovers the discharge opening 10, the gate 7 at the same time retaining the inlet opening closed. Furthermore, by arranging the inlet and outlet openings at one side of the vessel, it is possible to perform the operations above described with gates of minimum length.

The sections 2 and 3 of the vessel 1 may be connected in any desired manner, but as here shown they are adjustably connected by means of bolts 29 taking through securing lugs 30 attached to the sections.

In order that the vessel may be adjusted to a given capacity, the bolts 29 may be threaded through the lower lugs 30, and after adjusting the vessel to the required length, the latter may be held at such adjustment by set nuts 31.

It is to be understood that the apparatus herein described represents but one embodiment of my invention and is susceptible of many changes, both in the construction and relative arrangement of the parts, without departing from the spirit and scope thereof.

Claim—

1. A measuring apparatus comprising a measuring vessel formed of a plurality of alined sections, means relatively to adjust said sections to vary the capacity of the vessel, inlet and outlet openings near the upper and lower ends, respectively, of said vessel and both disposed adjacent the same side thereof, means to direct the material toward said inlet and outlet openings, respectively, sliding gates controlling the entrance and discharge of material and entering the vessel at that side adjacent which the material is admitted and discharged, whereby sliding gates of limited area may be employed, and lever mechanism for operating said sliding gates.

2. A measuring apparatus comprising a measuring vessel formed of a plurality of alined sections, means relatively to adjust said sections to vary the capacity of the vessel, inlet and outlet openings near the upper and lower ends respectively, of said vessel and both disposed adjacent the same side thereof, means to direct the material toward said inlet and outlet openings, respectively, sliding gates controlling the entrance and discharge of material and entering the vessel at that side adjacent which the material is admitted and discharged, whereby sliding gates of limited area may be employed, lever mechanism for operating said sliding gates, and a link connection between the lever and said sliding gates, whereby adjustment of the capacity of the vessel is permitted.

3. A measuring apparatus comprising a measuring vessel having inlet and outlet openings near the upper and lower ends, respectively, of said vessel and both disposed adjacent the same side thereof, means to direct the material toward said inlet and outlet openings, respectively, sliding gates maintained in substantially parallel planes and controlling the entrance and discharge of material and entering the vessel at that side adjacent which the material is admitted and discharged, whereby sliding gates of limited area may be employed, and lever mechanism for operating said sliding gates.

4. A measuring apparatus comprising a measuring vessel formed of a plurality of alined sections, means relatively to adjust said sections to vary the capacity of the vessel, there being inlet and outlet openings near the upper and lower ends, respectively, of said vessel and both disposed adjacent the same side thereof, means to direct the material toward said inlet and outlet openings, respectively, sliding gates controlling the entrance and discharge of material and entering the vessel at the side adjacent which the material is admitted and discharged, whereby sliding gates of limited area may be employed, and lever mechanism for operating said sliding gates, there being a hole in said vessel above the inlet opening to indicate the height of material in said vessel, by permitting the escape of surplus material.

5. A measuring apparatus comprising a measuring vessel formed of a plurality of alined sections, means relatively to adjust said sections to vary the capacity of the vessel, there being inlet and outlet openings near the upper and lower ends, respectively, of said vessel and both disposed adjacent the same side thereof, means to direct the material toward said inlet and outlet openings respectively, sliding gates controlling the entrance and discharge of material and entering the vessel at the side adjacent which the material is admitted and discharged, whereby sliding gates of limited area may be employed, and lever mechanism for operating said sliding gates, there being a hole in said vessel above the inlet opening to indicate the height of material in said vessel, by permitting the escape of surplus material, and manually controlled means for closing said opening when desired.

In testimony whereof, I have signed my name to this specification, in the presence of two subscribing witnesses.

GEORGE P. HEMSTREET.

Witnesses:
FRED. GORLICH,
FREDERICK L. EMERY.